US008142179B2

(12) United States Patent
Kihara et al.

(10) Patent No.: US 8,142,179 B2
(45) Date of Patent: Mar. 27, 2012

(54) STEREOLITHOGRAPHY APPARATUS

(75) Inventors: Nobuhiro Kihara, Kanagawa (JP);
Junichi Kuzusako, Saitama (JP);
Katsuhisa Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 12/327,076

(22) Filed: Dec. 3, 2008

(65) Prior Publication Data
US 2009/0196946 A1    Aug. 6, 2009

(30) Foreign Application Priority Data

Dec. 4, 2007 (JP) ................................. 2007-313094

(51) Int. Cl.
*B29C 35/08* (2006.01)
*B28B 1/16* (2006.01)

(52) U.S. Cl. ...................... 425/375; 425/174.4; 264/401; 264/308; 264/497

(58) Field of Classification Search ............... 425/174.4, 425/375, 150; 264/113, 308, 401, 497
See application file for complete search history.

(56) References Cited

U.S. PATENT DOCUMENTS

| | | | |
|---|---|---|---|
| 4,915,757 A | | 4/1990 | Rando |
| 5,391,072 A | * | 2/1995 | Lawton et al. ............. 425/174.4 |
| 5,529,473 A | * | 6/1996 | Lawton et al. ............. 425/174.4 |
| 5,545,367 A | * | 8/1996 | Bae et al. ...................... 264/401 |
| 7,052,263 B2 | * | 5/2006 | John .......................... 425/174.4 |

FOREIGN PATENT DOCUMENTS

| | | |
|---|---|---|
| EP | 0 484 086 | 4/1990 |
| JP | 2001-328175 | 11/2001 |

OTHER PUBLICATIONS

European Search Report dated Jan. 23, 2009.

\* cited by examiner

*Primary Examiner* — Maria Veronica Ewald
(74) *Attorney, Agent, or Firm* — SNR Denton US LLP

(57) ABSTRACT

A stereolithography apparatus that is configured to fabricate a three-dimensional model by forming a cured layer by irradiating an interface of a photocurable resin with light corresponding to sectional data of the three-dimensional model and stacking the cured layers includes a container holding the photocurable resin and having a constraining window configured to constrain the interface of the photocurable resin; a vertical movement table movable in a vertical direction orthogonal to the interface of the photocurable resin; an optical system configured to form the cured layer between the vertical movement table and the constraining window by irradiating the interface of the photocurable resin with light through the constraining window; and a position constraining mechanism configured to substantially flatten the constraining window by applying a force to the constraining window from the outside of the container when the cured layer is formed by the optical system.

9 Claims, 13 Drawing Sheets

▨ : UNIT EXPOSURE AREA EXPOSED BY FULL EXPOSURE

---- : OUTLINE OF SHAPE CORRESPONDING TO SECTIONAL DATA

: AREA EXPOSED BY BEAM SCANNING

STEREOLITHOGRAPHY APPARATUS

CROSS REFERENCES TO RELATED APPLICATIONS

The present invention contains subject matter related to Japanese Patent Application JP 2007-313094 filed in the Japanese Patent Office on Dec. 4, 2007, the entire contents of which are incorporated herein by reference.

BACKGROUND OF THE INVENTION

1. Field of the Invention

The present invention relates to a stereolithography apparatus and, more specifically, relates to a stereolithography apparatus capable of improving the lamination precision and forming a highly precise three-dimensional model when stereolithography is performed by a constrained surface method.

2. Description of the Related Art

In the related art, stereolithography methods include a free surface method in which photocurable resin is irradiated with light from above and the resin is cured at the liquid surface, and a constrained surface method in which photocurable resin in a transparent container is irradiated with light from the bottom and the resin is cured at the bottom surface of the container (for example, refer to Japanese Unexamined Patent Application Publication No. 2001-328175).

As shown in FIG. 1, with a stereolithography apparatus configured to carry out fabrication by the free surface method, the fluid surface of photocurable resin 12 in a container 11 is exposed to the atmosphere. Here, the fluid surface of the photocurable resin refers to the interface of the photocurable resin to be irradiated with light.

With such a stereolithography apparatus, a stage 13, which is a platform for a three-dimensional model 14 to be fabricated, is lowered by a distance equal to the thickness of one cured layer from the fluid surface of the photocurable resin 12 so as to focus a fabrication laser beam at the interface of the atmosphere and the photocurable resin 12. In this way, a cured layer is formed at the fluid surface of the photocurable resin 12. By repeating this process, a plurality of cured layers is stacked to form the three-dimensional model 14.

However, with the free surface method, since the fluid surface of the photocurable resin 12 is exposed to the atmosphere, the surface precision of the cured layer is determined by surface tension and other factors. Thus, there is a limit to the lamination precision of the cured layers. Therefore, it is difficult to fabricate the three-dimensional model 14 with high precision.

As shown in FIG. 2, with the stereolithography apparatus configured to carry out fabrication by the constrained surface method, the fluid surface of the photocurable resin 12 contained in a container 21 is not exposed to the atmosphere and is constrained by a glass plate 23, which is provided at the bottom surface of the container 21. With this stereolithography apparatus, a stage 22, which is a platform for the three-dimensional model 14 to be fabricated, is lifted by a distance equal to the thickness of one cured layer from the fluid surface of the photocurable resin 12 so as to focus a fabrication laser beam at the interface of the glass plate 23 and the photocurable resin 12. In this way, a cured layer is formed at the fluid surface of the photocurable resin 12. By repeating this process, a plurality of cured layers is stacked to form the three-dimensional model 14.

As described above, with the constrained surface method, since the fluid surface is constrained by the glass plate 23, the surface precision of the cured layer is determined by the surface precision of the glass plate 23. Therefore, compared with the free surface method, the smoothness of the fluid surface can be improved, and thus, the lamination precision is improved. As a result, stereolithography can be carried out with high precision.

SUMMARY OF THE INVENTION

With a stereolithography apparatus configured to carry out fabrication by the constrained surface method, the glass plate 23 should not have spherical aberration in order to focus the fabrication laser beam, and the thickness of the glass plate 23 should be smaller than a predetermined value. For example, in order to focus the fabrication laser beam to approximately 1 μm, the thickness of the glass plate 23 should be approximately 1.2 mm.

However, if the thickness of the glass plate 23 is reduced in this way, warpage occurs in the glass plate 23, as shown in FIG. 3. For example, when the glass plate 23 is constructed of silica glass having a diameter of 20 cm and a thickness of approximately 1.2 mm, the warpage is about 10 μm. This warpage is not ignorable when considering the improvement of the lamination precision and prevents improvement in the lamination precision of the three-dimensional model 14.

The present invention has been conceived in light of the problems described above and improves lamination precision so as to enable fabrication of a three-dimensional model with high precision.

A first embodiment of the present invention provides a stereolithography apparatus configured to fabricate a three-dimensional model by forming a cured layer by irradiating an interface of a photocurable resin with light corresponding to sectional data of the three-dimensional model and stacking the cured layers, the stereolithography apparatus including a container holding the photocurable resin and having a constraining window configured to constrain the interface of the photocurable resin; a vertical movement table movable in a vertical direction orthogonal to the interface of the photocurable resin; an optical system configured to form the cured layer between the vertical movement table and the constraining window by irradiating the interface of the photocurable resin with light through the constraining window; and a position constraining mechanism configured to substantially flatten the constraining window by applying a force to the constraining window from the outside of the container when the cured layer is formed by the optical system.

The stereolithography apparatus according to the first embodiment of the present invention further includes a parallel movement table configured to move a rectangular area in a parallel direction parallel to the interface of the photocurable resin when the optical system emits light to the interface of the photocurable resin in predetermined units of the rectangular area, wherein the parallel movement table can scan the rectangular area in the parallel direction by moving the rectangular area in the parallel direction, and wherein the position constraining mechanism can substantially flatten an area on the constraining window corresponding to the rectangular area when the rectangular area is irradiated with light emitted from the optical system, and the position constraining mechanism does not apply force from the outside of the container to the constraining window when the parallel movement table is moved.

The stereolithography apparatus according to the first embodiment of the present invention further includes pressure detecting means for detecting pressure applied to the vertical movement table; and contact detecting means for detecting contact between the vertical movement table and the constraining window on the basis of a change in pressure detected by the pressure detecting means, wherein, when stacking the cured layer, the vertical movement table can move in the vertical direction with reference to a position of the vertical movement table in the vertical direction when contact is detected by the contact detecting means.

With the stereolithography apparatus according to the first embodiment of the present invention, the contact detecting means can detect separation of the cured layer from the constraining window based on a change in pressure detected by the pressure detecting means, and, when the cured layer is formed, the cured layer can be separated from the constraining window by moving the vertical movement table in the vertical direction until separation is detected by the contact detecting means.

The stereolithography apparatus according to the first embodiment of the present invention further includes measuring means for measuring a distance from the constraining window to the vertical movement table in the vertical direction and wherein, when stacking the cured layer, the vertical movement table can move in the vertical direction on the basis of a measurement result of the measuring means.

A second embodiment of the present invention provides a stereolithography apparatus configured to fabricate a three-dimensional model by forming a cured layer by irradiating an interface of a photocurable resin with light corresponding to sectional data of the three-dimensional model and stacking the cured layers, the stereolithography apparatus including a container holding the photocurable resin and having a constraining window configured to constrain the interface of the photocurable resin; a vertical movement table movable in a vertical direction orthogonal to the interface of the photocurable resin; an optical system configured to form the cured layer between the vertical movement table and the constraining window by irradiating the interface of the photocurable resin with light through the constraining window; a pressure detecting unit configured to detect pressure applied to the vertical movement table; and a contact detecting unit configured to detect contact between the vertical movement table and the constraining window on the basis of a change in pressure detected by the pressure detecting means, wherein, when stacking the cured layer, the vertical movement table moves in the vertical direction with reference to a position of the vertical movement table in the vertical direction when contact is detected by the contact detecting means.

With the first embodiment of the present invention, the photocurable resin is held in the container having a constraining window that constrains the interface of the photocurable resin; the vertical movement table moves in the vertical direction vertical to the interface of the photocurable resin; and the optical system emits light to the interface of the photocurable resin through the constraining window. In this way, a cured layer is formed between the vertical movement table and the constraining window. Moreover, when the cured layer is formed by the optical system, the position constraining mechanism applied a force to the constraining window from the outside of the container to substantially flatten the constraining window.

With the second embodiment of the present invention, the photocurable resin is held in the container having a constraining window that constrains the interface of the photocurable resin, and the optical system emits light to the interface of the photocurable resin through the constraining window. In this way, a cured layer is formed between the vertical movement table and the constraining window. Moreover, pressure applied to the vertical movement table is detected, and the contact between the vertical movement table and the constraining window is detected on the basis of a change in the pressure. When stacking the cured layer, the vertical movement table moves in the vertical direction with reference to a position of the vertical movement table in the vertical direction when contact is detected by the contact detecting means.

As described above, according to embodiments of the present invention, lamination precision can be improved, and a three-dimensional model can be fabricated with high precision.

DESCRIPTION OF THE PREFERRED EMBODIMENTS

Detailed embodiments of the present invention will be described below with reference to the drawings.

Figure 1:
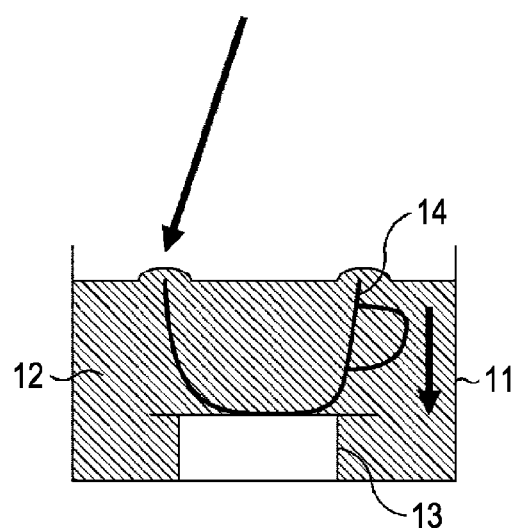
FIG. 1 illustrates a free surface method.
Figure 2:
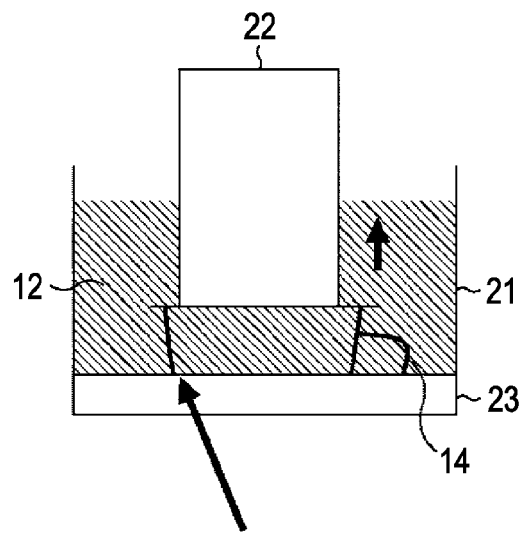
FIG. 2 illustrates a constrained surface method.
Figure 3:
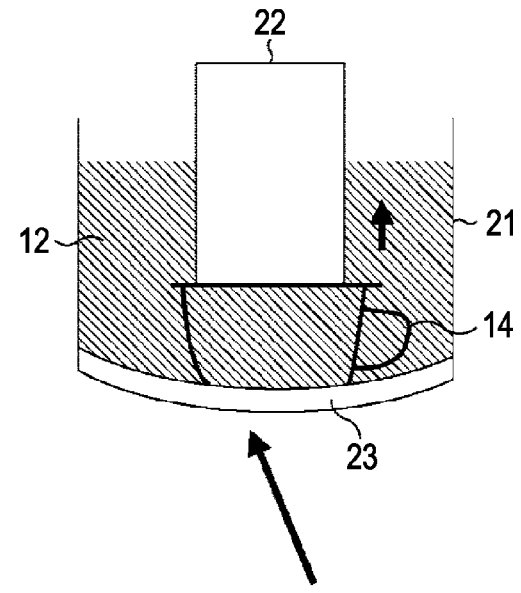
FIG. 3 illustrates bending of a glass plate that occurs when the constrained surface method is employed.
Figure 4:
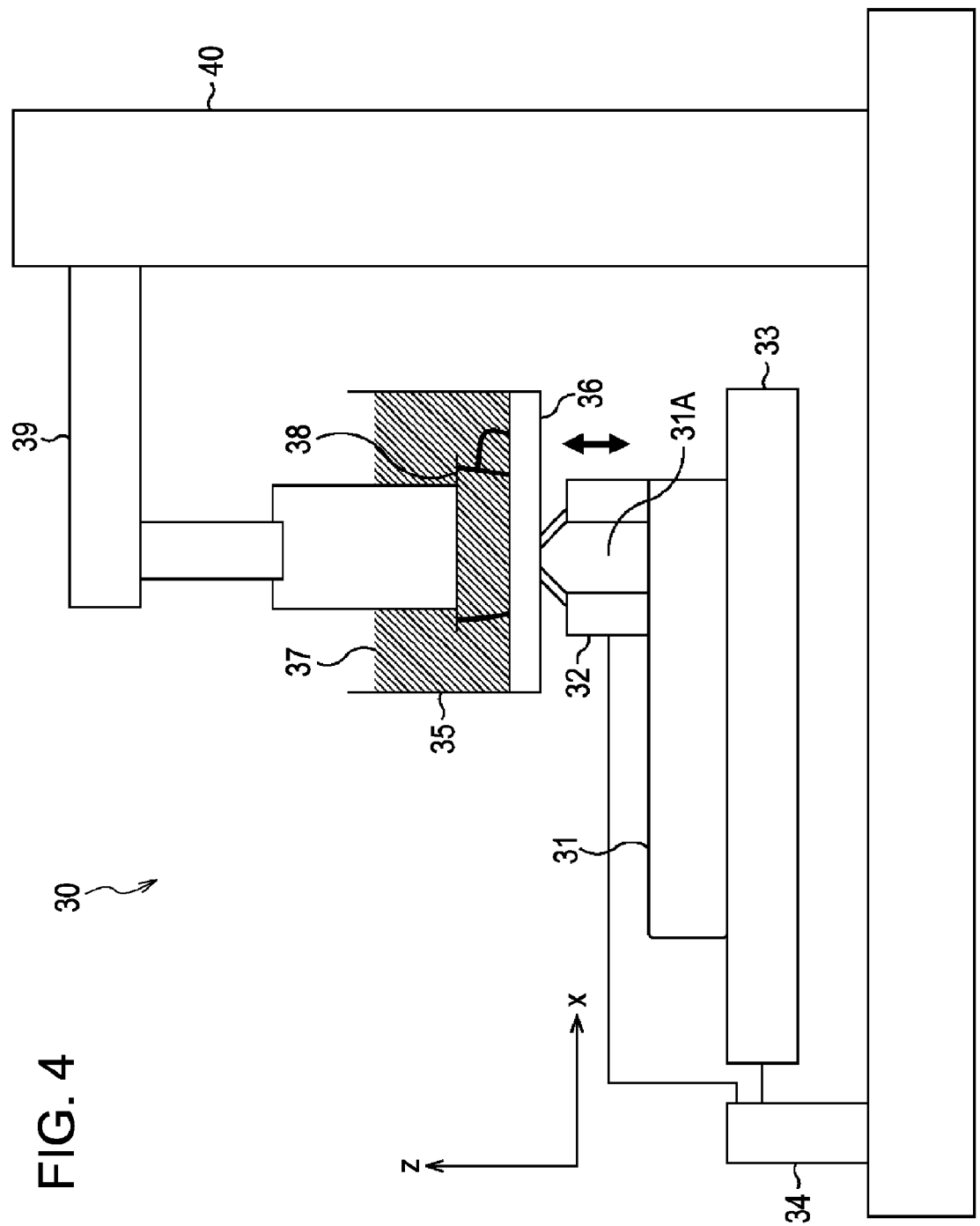
FIG. 4 is an external view of a stereolithography apparatus according to a first embodiment of the present invention.

FIG. 4 illustrates the external configuration of a stereolithography apparatus according to a first embodiment of the present invention.

A stereolithography apparatus 30, which is shown in FIG. 4, includes an optical system 31 that has an objective lens 31A, a position constraining mechanism 32, an XY stage 33, a driving unit 34, a container 35, a glass window 36, UV-curable resin 37 such as liquid resin, a Z stage 38, an arm 39, and a driving unit 40.

The stereolithography apparatus 30 carries out stereolithography according to the constrained surface method by constraining the fluid surface of the UV-curable resin 37 in the container 35 with the glass window 36 and irradiating the fluid surface of the UV-curable resin 37 with UV light through the glass window 36 in accordance with data about the three-dimensional shape of the three-dimensional model sliced into layers of a predetermined thickness in the lamination direction (hereinafter referred to as "sectional data").

The optical system 31 has the objective lens 31A that emits UV light to the UV-curable resin 37 and is disposed on the XY stage 33. The objective lens 31A is covered with the position constraining mechanism 32. The surface in contact with the bottom surface of the glass window 36 of the position constraining mechanism 32 has a rectangular opening of a predetermined size (hereinafter referred to as a "small exposure area"). The UV light that has passed through the objective lens 31A passes through this opening to the glass window 36 to expose an area on the fluid surface of the UV-curable resin 37 having a shape corresponding to the sectional data is exposed in units of the small exposure area.

The position constraining mechanism 32 is moved in the Z direction, which is a direction orthogonal to the fluid surface of the UV-curable resin 37, by the driving unit 34. The XY stage 33 is moved in the X or Y direction by the driving unit 34. The X and Y directions are directions parallel to the fluid surface of the UV-curable resin 37 and are orthogonal to each other.

Figure 11:
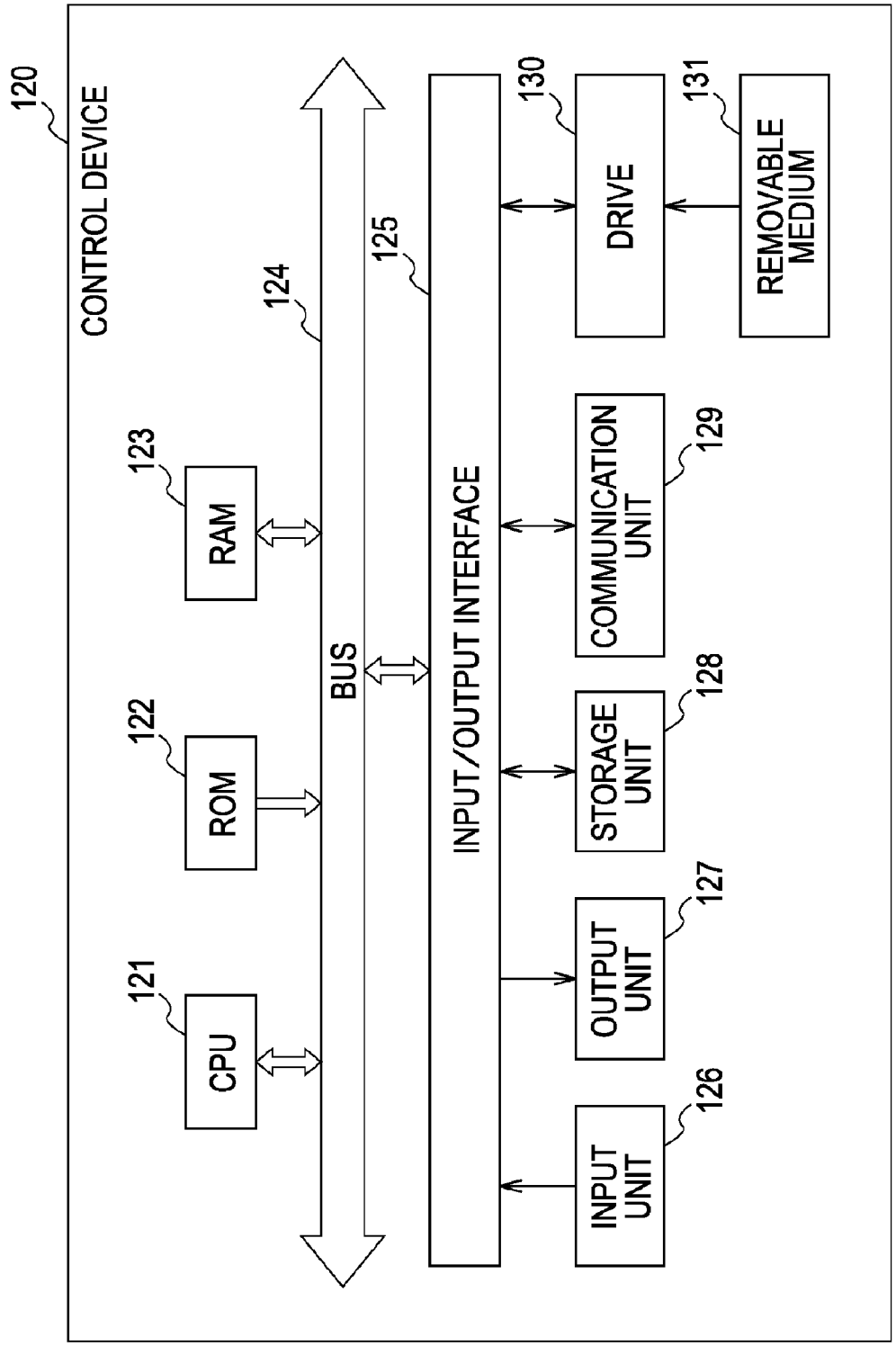
FIG. 11 is a block diagram of an example hardware configuration of a control device that controls each unit of the stereolithography apparatus illustrated in FIG. 4.

The driving unit 34 scans the small exposure area in the X direction by sequentially moving the XY stage 33 by a predetermined distance in the X direction according to the control by a control device 120 described below (FIG. 11). Then, the driving unit 34 moves the small exposure area to the subsequent scanning line adjacent in the Y direction by moving the XY stage 33 by predetermined distances in the X and Y directions according to the control by the control device 120. Then, the driving unit 34 scans the small exposure area again in the X direction according to the control of the control device 120.

Such a process is repeated to expose a work area formed of a predetermined number of small exposure areas arranged in the X and Y directions according to the sectional data. In this way, an area having a shape corresponding to the sectional data of one layer of the UV-curable resin 37 is exposed, and one cured layer is formed between the glass window 36 and the Z stage 38.

In this way, the stereolithography apparatus 30 exposes the entire work area by paving the work area with the small exposure areas in the X and Y direction in a manner similar to paving tiles. The stereolithography method of the stereolithography apparatus 30 will be referred to as a "tiling method" in order to differentiate it from beam scanning methods and full-exposure methods, according to the related art, in which the small exposure area and the work area are the same size.

According to the control by the control device 120, the driving unit 34 prevents downward warpage due to the weight of the glass window 36 by lifting the position constraining mechanism 32 in the Z direction such that the position constraining mechanism 32 restricts the position of the glass window 36 when exposure is carried out at the optical system 31. In this way, the glass window 36 is substantially flattened, and thus, the surface precision of the cured layer and the lamination precision are improved.

The container 35 is disposed above the objective lens 31A. The glass window 36 is provided at the bottom of the container 35. The container 35 holds the UV-curable resin 37.

The Z stage 38 is submerged into the UV-curable resin 37 in the container 35 and is connected to the driving unit 40 via the arm 39. The Z stage 38 is moved in the Z direction according to the control of the driving unit 40.

According to the control of the control device 120, the driving unit 40 moves the Z stage 38 in the Z direction each time exposure corresponding to the sectional data of one layer is completed so as to separate the cured layer, which is formed between the glass window 36 and the Z stage 38 from the glass window 36. Then, the driving unit 40 moves the Z stage 38 in the Z direction such that the distance between the glass window 36 and the fabricated cured layer is equal to the thickness of one cured layer. In this way, a plurality of cured layers is stacked to fabricate a three-dimensional model.

Figure 5:
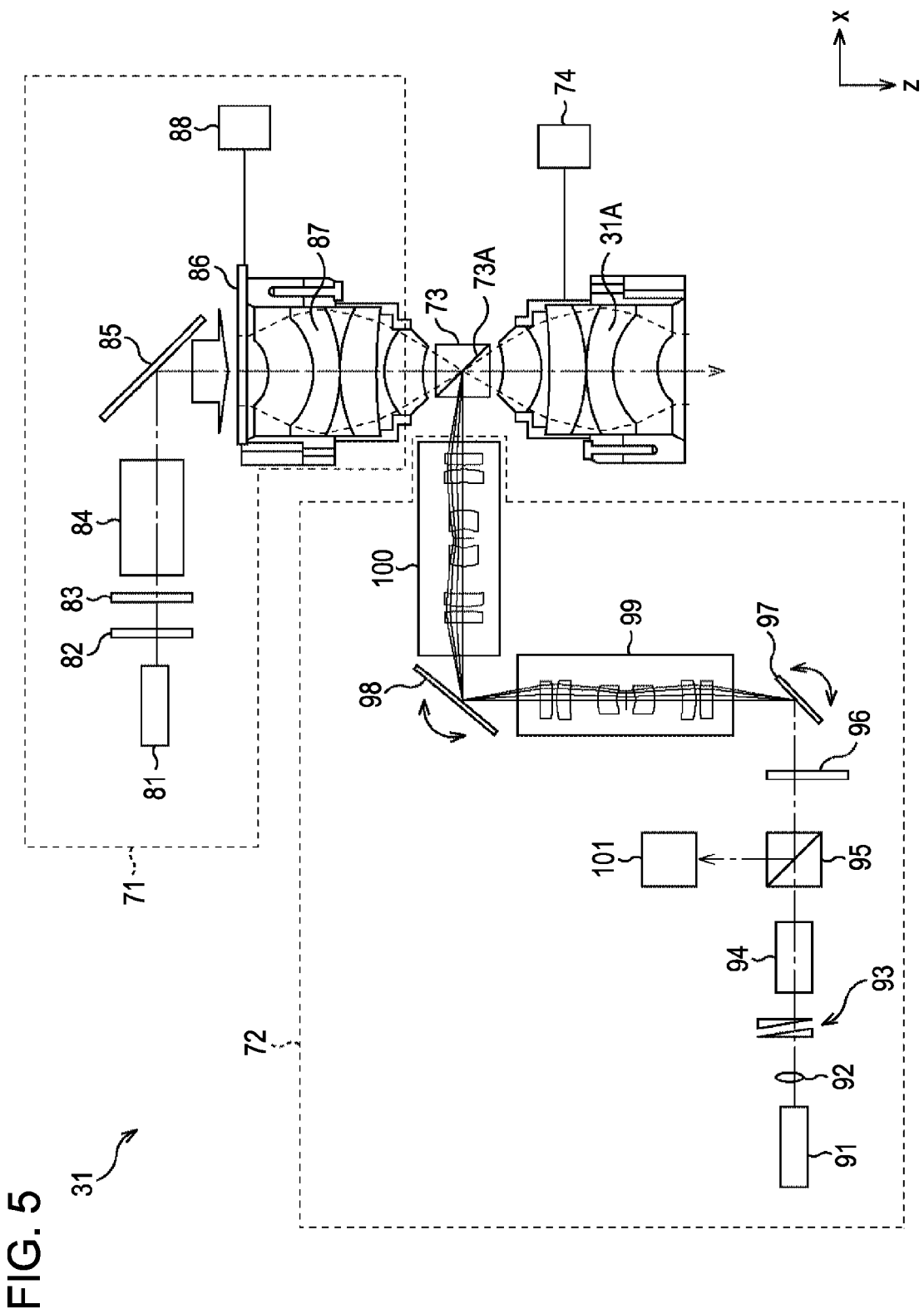
FIG. 5 illustrates an optical system illustrated in FIG. 4.

FIG. 5 illustrates an example configuration of the optical system 31, shown in FIG. 4.

The optical system 31 shown in FIG. 5 includes the objective lens 31A, a full-exposure optical system 71, a beam-scanning optical system 72, a polarizing beam splitter 73, and a driving unit 74.

The full-exposure optical system 71 is an optical system configured to expose, at once, all of the small exposure areas at the fluid surface of the UV-curable resin 37 in the container 35. The full-exposure optical system 71 includes a light source 81, a shutter 82, a polarizing plate 83, a beam integrator 84, a mirror 85, a spatial light modulator 86, a focusing lens 87, and a driving unit 88.

The light source 81 may be, for example, an array of high-power blue light-emitting diodes (LEDs). A coherent laser light source does not have to be used for the light source 81, unlike a light source 91 for beam scanning, which is described below. The light source 81 emits UV light for full exposure according to the control by the control device 120.

The shutter 82 turns on or off the exposure by the full-exposure optical system 71 by transmitting or blocking the UV light emitted from the light source 81 according to the control of the control device 120.

The polarizing plate 83 polarizes the UV light that has passed through the shutter 82 into a predetermined polarized light. In other words, the polarizing plate 83 polarizes the light so that the spatial light modulator 86 can spatially modulate the UV light from the light source 81.

The beam integrator 84 equalizes the UV light polarized by the polarizing plate 83. A commonly used beam integrator 84 may be a fly-eye type beam integrator having an array of a plurality of lens elements or a light-rod type beam integrator capable of total reflection in the inside of cylindrical rod lens shaped as, for example, a rectangular column.

The mirror 85 reflects the UV light equalized by the beam integrator 84 to the spatial light modulator 86.

The spatial light modulator 86 includes, for example, a transmissive liquid crystal panel. The spatial light modulator 86 spatially modulates part of the UV light reflected at the mirror 85 so that the UV light is projected onto the fluid surface of the UV-curable resin 37 in units of small exposure areas corresponding to the shape of the sectional data.

In other words, on the basis of a driving signal for controlling each pixel in the liquid crystal received from the control device 120, the spatial light modulator 86 spatially modulates the UV light passing through by changing the alignment of the liquid crystal molecules in the pixels and, thus, changing the transmissive polarization direction in such a manner corresponding to the shape of the image to be projected, in units of small exposure areas, corresponding to the sectional data.

As a result, the emission of UV light to a small exposure area on the fluid surface of the UV-curable resin 37 is turned on or off for each rectangular area (hereinafter referred to as a "unit exposure area") corresponding to one pixel of the liquid crystal panel, in accordance with the shape, in units of small exposure areas, corresponding to the sectional data. When the emission of UV light to a small exposure area is turned on, UV light is emitted to all corresponding unit exposure areas at once. In this way, the small exposure areas on the fluid surface of the UV-curable resin 37 are irradiated with UV light to form a shape corresponding to the sectional data.

Instead of a transmissive liquid panel, the spatial light modulator 86 may by a DMD or a reflective liquid crystal device (liquid crystal on silicon (LCOS)) in which minute reflective mirrors, whose tilt angles change in accordance with an input signal, are arranged for each pixel.

The focusing lens 87 is provided between the spatial light modulator 86 and the polarizing beam splitter 73 and, together with the objective lens 31A, functions as a projection optical system configured to form an image on the UV-curable resin 37 with the UV light spatially modulated at the spatial light modulator 86.

The focusing lens 87 is constructed of a group of lenses for correcting distortion caused by the UV light modulated by the spatial light modulator 86 passing through the objective lens 31A and functions as a projection optical system. The focusing lens 87 is capable of reducing distortion.

For example, by constructing the focusing lens 87 such that the focusing lens 87 and the objective lens 31A are symmetric optical systems, the UV light spatially modulated by the spatial light modulator 86 is focused at a focal point forward of the objective lens 31A, above a reflective/transmissive surface 73A of the polarizing beam splitter 73. In this way, distortion is reduced.

The driving unit 88 drives the spatial light modulator 86 in the Z direction, which is the optical axis direction, according to the control of the control device 120 based on returned light detected by a reflection-light monitor unit 101 of the beam-scanning optical system 72 and focuses the UV light emitted from the full-exposure optical system 71 at the fluid surface of the UV-curable resin 37.

The beam-scanning optical system 72 is an optical system configured to scan a small exposure area on the fluid surface of the UV-curable resin 37 in the container 35 with a laser beam to carry out beam scanning exposure. The beam-scanning optical system 72 includes a light source 91, a collimating lens 92, an anamorphic lens 93, a beam expander 94, a beam splitter 95, a shutter 96, galvano mirrors 97 and 98, relay lenses 99 and 100, and the reflection-light monitor unit 101.

The light source 91 is constructed of a semiconductor laser that emits a laser beam with a relatively short wavelength, such as blue to purple light. The light source 91 emits a laser light beam for beam scanning from the beam-scanning optical system 72 according to the control of the control device 120. Instead of a semiconductor laser, a gas laser may be used as the light source 91.

The collimating lens 92 converts the divergence angle of the light beam emitted from the light source 91 so as to acquire a substantially collimated beam. The anamorphic lens 93 shapes the substantially collimated oval light beam acquired by the collimating lens 92 into a substantially circular beam.

The beam expander 94 has a plurality of lenses and adjusts the size of the beam diameter by converting the diameter of the light beam shaped into a substantially circular beam by the anamorphic lens 93 into a size suitable for the opening and/or numerical aperture (NA) of the objective lens 31A.

The beam splitter 95 transmits the light beam emitted from the light source 91 to the UV-curable resin 37 in the container 35 and reflects the light beam reflected at the UV-curable resin 37 and through each optical system to the reflection-light monitor unit 101.

The shutter 96 transmits or blocks the light beam transmitted through the beam splitter 95 and turns on or off the beam scanning exposure by the beam-scanning optical system 72 according to the control by the control device 120. Instead of providing the shutter 96 and transmitting or blocking the light beam, the optical system 31 may directly control the emission of a light beam from the light source 91 in order to turn on or off the beam scanning exposure.

The galvano mirrors 97 and 98 each have a reflection unit (not shown), such as a mirror, that is rotatable in a predetermined direction and an adjusting unit (not shown) that is configured to adjust the angle of the rotation direction of the reflection unit according to the control by the control device 120. By adjusting the angle of the reflection unit with the adjusting unit, a light beam reflected at the reflection unit is scanned in the X or Y direction within a small exposure area on the fluid surface of the UV-curable resin 37.

More specifically, the galvano mirror 97 reflects a light beam that has passed through the shutter 96 to the galvano mirror 98 and scans the light beam in the X direction within a small exposure area on the fluid surface of the UV-curable resin 37. The galvano mirror 98 reflects the light beam reflected at the galvano mirror 97 to the polarizing beam splitter 73 and scans the light beam in the Y direction on the fluid surface of the UV-curable resin 37.

In the optical system 31, polygon mirrors may be used instead of the galvano mirrors 97 and 98.

The relay lenses 99 and 100 are each constructed of a group of lenses including one or more lenses. The relay lens 99 emits a parallel incident light beam in a parallel manner over the scanning angle scanned by the galvano mirror 97 with the light beam and forms an image on the galvano mirror 98 with the light beam reflected at the galvano mirror 97. The relay lens 100 emits a parallel incident light beam in a parallel manner over the scanning angle scanned by the galvano mirror 98 with the light beam reflected at the galvano mirror 98 and forms an image with the light beam on the reflective/transmissive surface 73A of the polarizing beam splitter 73.

In this way, by providing the relay lens 99 between the galvano mirror 97 and the galvano mirror 98 and providing the relay lens 100 between the galvano mirror 98 and the polarizing beam splitter 73, an image can be formed with the light beam on the reflective/transmissive surface 73A of the polarizing beam splitter 73, even when the galvano mirror 97 and the galvano mirror 98 are not disposed close to each other.

The reflection-light monitor unit 101 detects the returned light beam reflected at the fluid surface of the UV-curable resin 37 using, for example, an astigmatic method or a triangulation method and inputs the detected light beam to the control device 120.

The polarizing beam splitter 73 combines the UV light from the full-exposure optical system 71 and the light beam from the beam-scanning optical system 72 and guides the combined light to the UV-curable resin 37. The polarizing beam splitter 73 is disposed such that the reflective/transmissive surface 73A is aligned with the forward focal point of the objective lens 31A.

The objective lens 31A is constructed of lens group including one or more lenses. The objective lens 31A forms an image on the fluid surface of the UV-curable resin 37 with the UV-light from the full-exposure optical system 71 and focuses the light beam from the beam-scanning optical system 72.

The objective lens 31A is constructed such that the light beam polarized by the galvano mirrors 97 and 98 of the beam-scanning optical system 72 is scanned at uniform velocity in the small exposure area of the fluid surface of the UV-curable resin 37.

For example, as the objective lens 31A, a so-called fθ lens is used. The fθ lens has an image height Y that is proportional to the incident angle θ, and the image height Y is equal to the product of the focal length f and incident angle θ (Y=f×θ). In such a case, since the scanning speed of the light beam is constant, regardless of the incident position on the objective lens 31A, a difference in the designed shape and the actual shape of the laminated layers caused by a non-uniform scanning speed is prevented from occurring.

The driving unit 74 moves the objective lens 31A in the Z direction to focus the light beam emitted from the beam-scanning optical system 72 at the fluid surface of the UV-curable resin 37 according to the control by the control device 120 based on the returned light beam detected by the reflection-light monitor unit 101 of the beam-scanning optical system 72. More specifically, the driving unit 74 moves the objective lens 31A in the Z direction such that the rear focal point of the objective lens 31A is aligned with the fluid surface of the UV-curable resin 37 in the image-data compression unit 35.

Next, stereolithography performed by the stereolithography apparatus 30 according to the tiling method will be described with reference to FIG. 6.

In the example in FIG. 6, a work area 105 is a 10×10 cm square whose sides are aligned with the X and Y directions, and a small exposure area 106 is a 1×1 cm square whose sides are aligned with the X and Y directions, as shown in FIG. 6. Accordingly, the work area 105 is formed by arranging ten small exposure areas 106 in each of the X and Y directions.

Figure 6A:
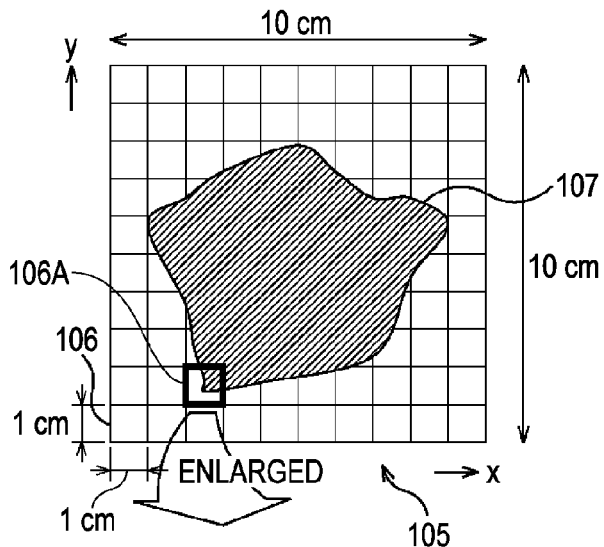
FIG. 6 illustrates stereolithography according to a tiling method performed by the stereolithography apparatus illustrated in FIG. 4.
Figure 6B:
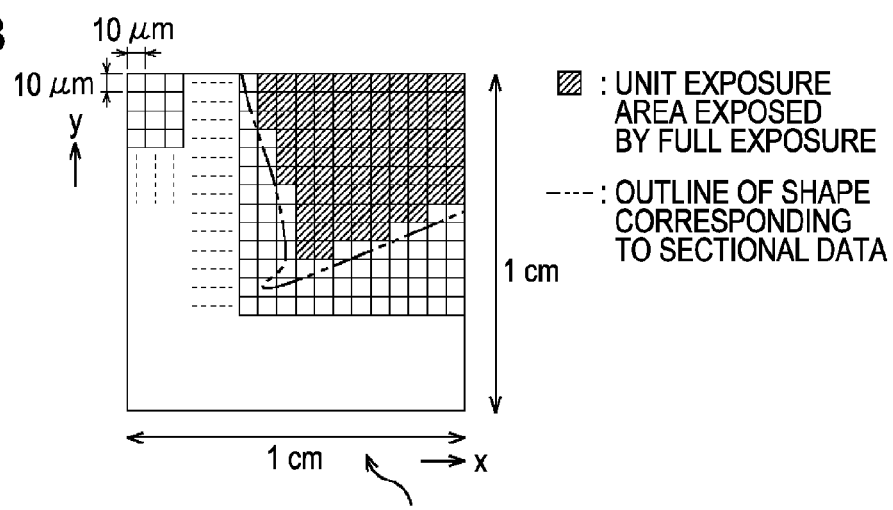

As shown in FIG. 6A, when the center area 107 of the work area 105 has a shape corresponding to the sectional data and when the stereolithography apparatus 30 carries out exposure using on the full-exposure optical system 71, the enlarged view of a small exposure area 106A, which is the small exposure area second from the bottom and third from the left of the small exposure areas 106 included in the work area 105, becomes as shown in FIG. 6B.

In other words, when the number of pixels in the X and Y directions of the spatial light modulator 86 is 1000, the number of unit exposure areas in the X and Y directions of the small exposure area 106A is 1000, and the length in the X and Y directions of each unit exposure area in the small exposure area 106A is 10 µm, as shown in FIG. 6B.

In contrast, with a full-exposure method according to the related art, since the small exposure area and the work area are the same size, the length in the X and Y directions of each unit exposure area in a small exposure area is 100 µm (=10 cm/1000 unit exposure areas). Compared with full-exposure according to a full-exposure method, full-exposure according to the tiling method performed by the stereolithography apparatus 30 can be performed with high precision. As a result, the stereolithography apparatus 30 can perform highly precise stereolithography.

In FIG. 6B, the hatched area represents the unit exposure areas in the small exposure area 106A that is exposed at once by the full-exposure optical system 71, and the chained double-dash line represents the outline of the shape corresponding to the sectional data. As shown in FIG. 6B, when only the full-exposure optical system 71 is used for exposure, only the unit exposure areas inside the outline is exposed, and the unit exposure areas overlapping with the outline and the unit exposure areas outside the outline are not exposed.

Figure 6C:
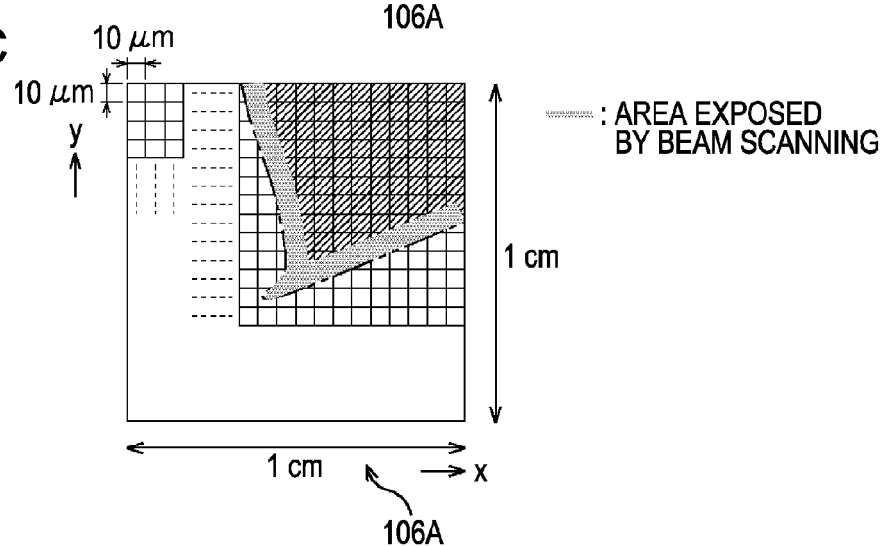

On the other hand, when the stereolithography apparatus 30 carries out exposure using both the full-exposure optical system 71 and the beam-scanning optical system 72, the enlarged view of the small exposure area 106A becomes as shown in FIG. 6C.

Also in FIG. 6C, the hatched area represents the unit exposure areas in the small exposure area 106A that is exposed at once by the full-exposure optical system 71, and the chained double-dash line represents the outline of the shape corresponding to the sectional data.

As shown in FIG. 6C, when the stereolithography apparatus 30 carries out exposure using both the full-exposure optical system 71 and the beam-scanning optical system 72, similar to the case shown in FIG. 6B, the unit exposure areas inside the outline are exposed by the full-exposure optical system 71, and then, as shown in FIG. 6C, vector scanning or raster scanning of a light beam is performed by the beam-scanning optical system 72 to the unit exposure areas inside the outline that are not exposed at once by full-exposure. Vector scanning refers to curved scanning, and raster scanning refers to unidirectional scanning.

As described above, since beam scanning exposure of the unit exposure areas inside the outline, which overlap with unit exposure areas not exposed, is possible when the stereolithography apparatus 30 carries out exposure using both the full-exposure optical system 71 and the beam-scanning optical system 72, the shape corresponding to the sectional data can be exposed with higher precision, compared with when only the full-exposure optical system 71 is used for exposure. As a result, a highly precise three-dimensional model can be fabricated.

Since the tiling method is also applied to the beam scanning exposure carried out by the stereolithography apparatus 30, the beam scanning area becomes small, and beam scanning exposure higher precision is possible, compared with beam scanning exposure according to a beam scanning method of the related art in which the small exposure area and the work area are the same size.

Next, position control of the glass window 36 by the position constraining mechanism 32, which is shown in FIG. 4, will be described with reference to FIGS. 7 and 8.

Figure 7:
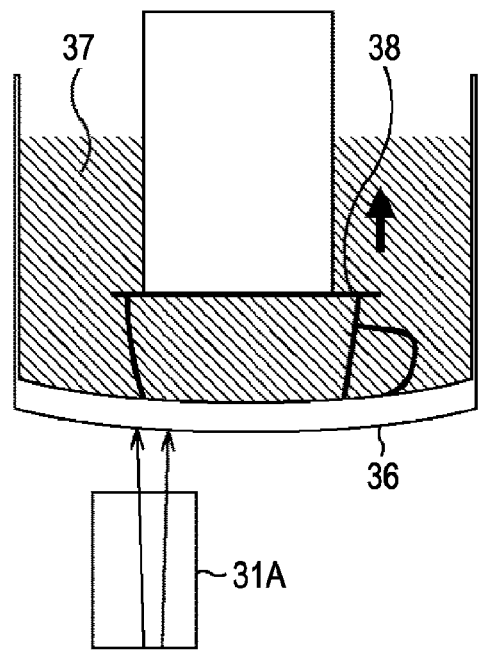
FIG. 7 illustrates the constraining of the position of a glass window.
Figure 8:
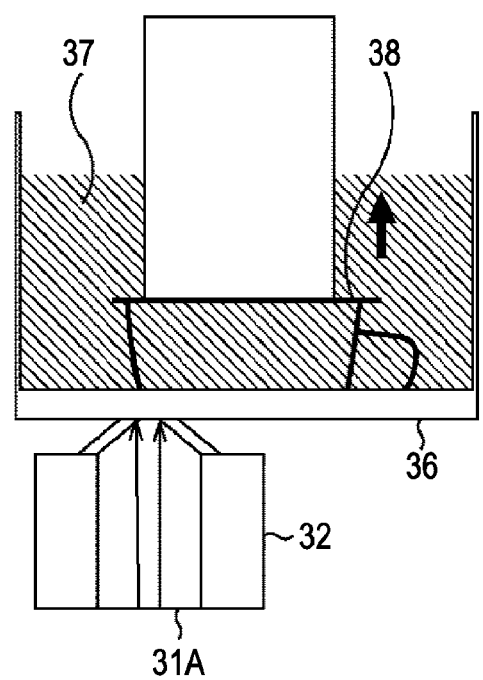
FIG. 8 illustrates the constraining of the position of the glass window.

As shown in FIG. 7, when the position constraining mechanism 32 is not provided, downward warpage occurs in the glass window 36 due to the weight of the glass window 36, the weight of the UV-curable resin 37, the weight of the laminated cured layers, and so on, causing a reduction in the lamination precision. Therefore, as shown in FIG. 8, in the stereolithography apparatus 30, the position constraining mechanism 32 surrounds the objective lens 31A. When the fluid surface of the UV-curable resin 37 is exposed in unit exposure areas, the position constraining mechanism 32 applies a force from the outside to around an area of the glass window 36, corresponding to the small exposure area in order to substantially flatten the area. As a result, the lamination precision is improved.

Next, the detailed structure of the position constraining mechanism 32 will be described with reference to FIGS. 9 and 10.

Figure 9:
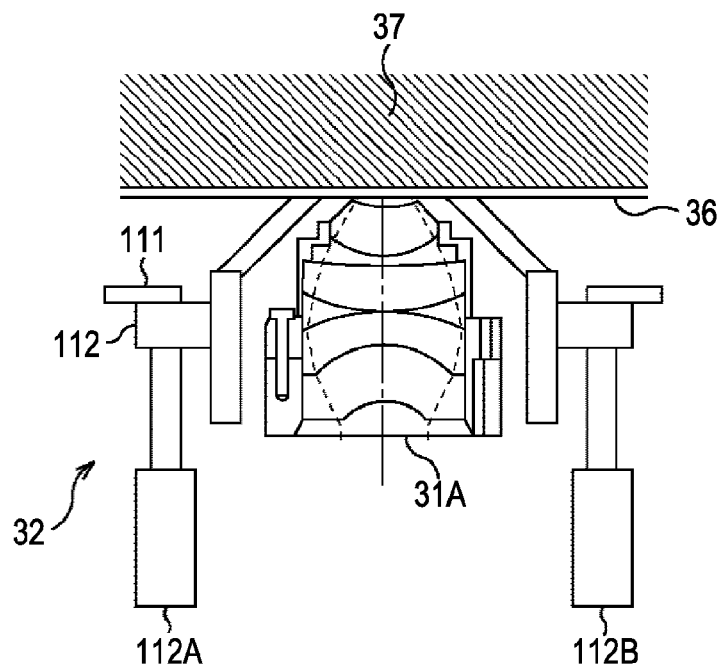
FIG. 9 illustrates the detailed configuration of a position constraining mechanism illustrated in FIG. 4.
Figure 10:
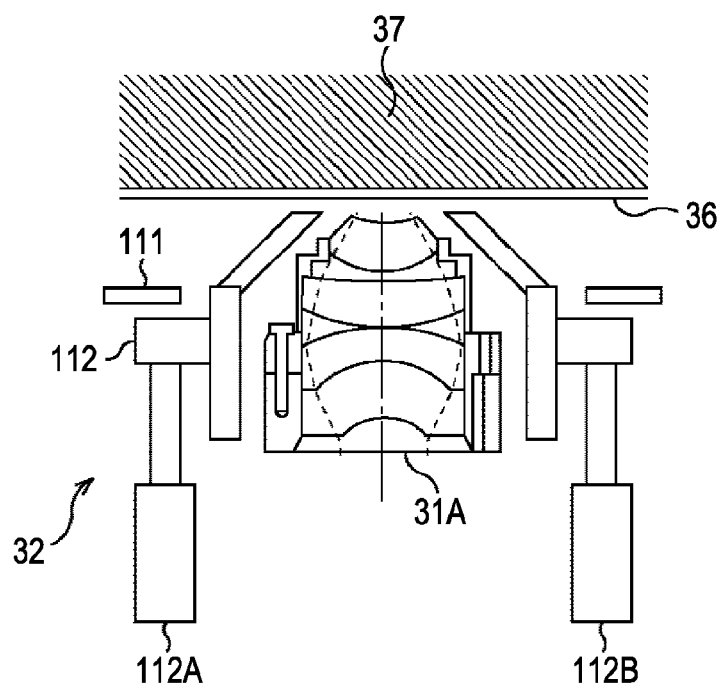
FIG. 10 illustrates the detailed configuration of the position constraining mechanism illustrated in FIG. 4.

As shown in FIGS. 9 and 10, the position constraining mechanism 32 includes a stopper 111 and a push-up mechanism 112 having two solenoids 112A and 112B.

As shown in FIGS. 9 and 10, the stopper 111 is disposed such that the push-up mechanism 112 applies a force to the glass window 36 to substantially flatten the glass window 36 when the lifting of the push-up mechanism 112 is stopped by the stopper 111. The solenoids 112A and 112B are driven by the driving unit 34 and move the push-up mechanism 112 in the Z direction.

When the optical system 31 exposes a small exposure area, the driving unit 34 drives the solenoids 112A and 112B so as to move the push-up mechanism 112 in the Z direction, as shown in FIG. 9. This upward movement of the push-up mechanism 112 is stopped by the stopper 111, and thus, the push-up mechanism 112 substantially flattens the glass window 36. In this way, when the position of the push-up mechanism 112 is mechanically controlled by the stopper 111, a position reproducibility of several microns can be maintained.

When the XY stage 33 moves the small exposure area to be exposed by the optical system 31, as shown in FIG. 10, the driving unit 34 drives the solenoids 112A and 112B in order to lower the push-up mechanism 112 in the Z direction. In this way, when the small exposure area is moved, the glass window 36 can be prevented from being damaged by the position constraining mechanism 32 rubbing against the glass window 36.

FIG. 11 shows an example hardware configuration of the control device 120 that controls each unit in the stereolithography apparatus 30, shown in FIG. 4.

In the control device 120 shown in FIG. 11, a bus 124 mutually connects a central processing unit (CPU) 121, a read only memory (ROM) 122, a random access memory (RAM) 123.

The bus 124 is further connected to an input/output interface 125. The input/output interface 125 is connected to a keyboard, a mouse, an input unit 126 that includes a microphone, a display, an output unit 127 that includes a speaker, a storage unit 128 that includes a hard disk and a nonvolatile memory, a communication unit 129 that includes a network interface and communicates with the stereolithography apparatus 30, and a drive 130 that drives a removable medium 131, such as a magnetic disk, an optical disk, a magneto-optical disk, or a semiconductor memory.

There is stored in the storage unit 128, for example, a program for converting three-dimensional data of a three-dimensional model created using CAD into stereo lithograph (STL), which is a format used to represent the surface of a three-dimensional model with small triangular surfaces, a program for creating sectional data of the three-dimensional model from the three-dimensional data converted into STL, and a program for controlling the full-exposure optical system 71 and the beam-scanning optical system 72 on the basis of the sectional data of the three-dimensional data.

In the control device 120, the control device 120 loads and executes, for example, a program stored in the storage unit 128 on the RAM 123 via the input/output interface 125 and the bus 124 the program and controls each device in the stereolithography apparatus 30 via the communication unit 129 such that the stereolithography apparatus 30 performs stereolithography.

In response to an input from the input unit 126, the CPU 121 of the control device 120, for example, determines the intensity of the UV-light emitted from the light source 81 or the intensity of the light beam emitted from the light source 91 and inputs a control signal for controlling the intensity to the light source 81 or 91 via the communication unit 129. In response to an input from the input unit 126, the CPU 121 inputs a control signal for turning on or off exposure to the shutter 82 or 96 via the communication unit 129.

In response to the sectional data, the CPU 121 inputs a driving signal for controlling the pixels in the liquid crystal panel to the spatial light modulator 86 via the communication unit 129 so as to display an image formed by unit exposure areas having a shape corresponding to the sectional data.

On the basis of the returned light beam from the reflection-light monitor unit 101 input via the communication unit 129, the CPU 121 inputs a control signal for moving the spatial light modulator 86 in the Z direction to the driving unit 88 via the communication unit 129 and inputs a control signal for moving the objective lens 31A in the Z direction to the driving unit 74 via the communication unit 129.

In response to the sectional data, the CPU 121 inputs a control signal for adjusting the angle of the reflective section of the galvano mirrors 97 and 98 so as to expose the unit exposure areas corresponding to the sectional data to the galvano mirrors 97 and 98 via the communication unit 129.

When exposing a small exposure area, the CPU 121 controls the solenoids 112A and 112B of the position constraining mechanism 32 via the driving unit 34, lifts the push-up mechanism 112 in the Z direction, and constrains the position of the glass window 36. Every time exposure of a small exposure area is completed, the CPU 121 controls the solenoids 112A and 112B via the driving unit 34, lowers the push-up mechanism 112 in the Z direction, and releases the glass window 36.

The CPU 121 inputs a control signal for moving the XY stage 33 in the X direction by a predetermined distance at a predetermined timing to the driving unit 34 via the communication unit 129 and scans the small exposure area in the X direction. Then, upon completion of scanning of the small exposure area in the X direction, the CPU 121 inputs a control signal for moving the small exposure area to the start position on the subsequent scanning line to the driving unit 34 via the communication unit 129.

The CPU 121 inputs a control signal for moving the Z stage 38 in the Z direction by a predetermined distance to the driving unit 40 via the communication unit 129, every time exposure corresponding to sectional data for one layer is completed. In this way, the cured layer formed between the Z stage 38 and the glass window 36 is separated from the glass window 36. Then, the Z stage 38 moves to a position where the distance between the glass window 36 and the cured layer equals the thickness of one cured layer.

Next, a stereolithography process carried out by the CPU 121, which is shown in FIG. 11, will be described with reference to FIG. 12. This stereolithography process is started when stereolithography is instructed by, for example, a user operating the input unit 126.

In Step S11, in response to the input from the input unit 126, the CPU 121 selects three-dimensional data of a three-dimensional model assigned by the user as three-dimensional data for the three-dimensional model to be fabricated. Then, the CPU 121 creates sectional data from the three-dimensional data.

In Step S12, the CPU 121 carries out initialization. More specifically, for example, the CPU 121 controls the driving units 34 and 40 to move the XY stage 33 and the Z stage 38 to their start points. The CPU 121 inputs control signals for controlling the intensities of UV light and a light beam to the light sources 81 and 91 and measures the intensities of the UV light emitted from the light source 81 and the light beam emitted from the light source 91 in response to the control signals.

In Step S13, the CPU 121 controls the driving units 34 and 40 so as to move the XY stage 33 and the Z stage 38 to a predetermined start position of fabrication. In Step S14, the CPU 121 controls the solenoids 112A and 112B via the driving unit 34 and lifts the push-up mechanism 112 of the position constraining mechanism 32. The lifting is stopped by the stopper 111, and the push-up mechanism 112 applies a force from the outside to the glass window 36 so as to constrain the position of the glass window 36 from below.

In Step S15, the CPU 121 controls the driving unit 40 to lower the Z stage 38 very slowly with the arm 39 in the Z direction by a predetermined distance. The distance is predetermined such that the Z stage 38 is positioned near the surface of the glass window 36. In Step S16, the CPU 121 controls the driving unit 40 to stop the Z stage 38 with the arm

39. The driving unit 40 sets the current position of the Z stage 38 as a reference for a fabrication position in the Z direction (hereinafter referred to as a "fabrication reference position") and controls the subsequent movement of the Z stage 38.

In Step S17, the CPU 121 controls the driving unit 40 to lift the Z stage 38 to a position away from the fabrication reference position by a distance equal to one cured layer. In Step S18, the CPU 121 carries out a layer fabricating process to form one cured layer. Details of this layer fabricating process will be described later with reference to the flow chart illustrated in FIG. 13.

In Step S19, the CPU 121 controls the driving unit 40 to lift the Z stage 38 in the Z direction by a predetermined distance. In this way, the cured layer formed between the Z stage 38 and the glass window 36 is separated from the glass window 36.

In Step S20, the CPU 121 determines whether or not to end the lamination process, i.e., determines whether or not the processing of Step S18 can been carried out a number of times corresponding to the number of layers in the three-dimensional data selected in Step S11. In Step S20, if the CPU 121 determines not to end the lamination process, i.e., if the three-dimensional model having a shape corresponding to the three-dimensional data selected in Step S11 is not yet fabricated, in Step S21, the CPU 121 controls the driving unit 34 to move the XY stage 33 to the fabrication start position again.

In Step S22, similar to Step S14, the CPU 121 controls the solenoids 112A and 112B via the driving unit 34 to lift the push-up mechanism 112 of the position constraining mechanism 32 in the Z direction so as to constrain the position of the glass window 36 from below.

In Step S23, the CPU 121 controls the driving unit 40 to move the Z stage 38 in the Z direction to a position a predetermined distance away from the fabrication reference position (for example, the thickness of several cured layers that are to be stacked before the subsequent process is started) such that the distance between the upper surface of the glass window 36 and the bottom surface of the fabricated cured layer equals the thickness of one cured layer to be fabricated subsequently. Then, the process returns to Step S18, and Steps S18 to S23 are repeated until it is determined to end the lamination process. In this way, cured layers are stacked until the three-dimensional model having a shape corresponding to the three-dimensional data selected in Step S11 is fabricated.

In contrast, if it is determined to end the lamination process in Step S20, i.e., if it is determined that a three-dimensional model having a shape corresponding to the three-dimensional data selected in Step S11 has been fabricated, in Step S24, the CPU 121 controls the driving units 34 and 40 to move the positions of the XY stage 33 and the Z stage 38 to their start points. Then, the process ends.

Next, the layer fabricating process in Step S18 in FIG. 12 will be described with referenced to FIG. 13.

In Step S41, the CPU 121 controls each unit to expose the fluid surface of the UV-curable resin 37 in the container 35 in units of small exposure areas with UV light from the full-exposure optical system 71 or a light beam from the beam-scanning optical system 72.

In Step S42, the CPU 121 controls the solenoids 112A and 112B via the driving unit 34 to lower the push-up mechanism 112 of the position constraining mechanism 32 in the Z direction so that the push-up mechanism 112 does not contact the glass window 36 and does not apply a force from the outside to the glass window 36. In Step S43, the CPU 121 determines whether or not the process of Step S41 has been repeated for a predetermined number of times (for example, the number of small exposure areas arranged in the X direction in the work area).

In Step S43, when it is determined that the processing of Step S41 has not been repeated for the predetermined number of times, in Step S44, the CPU 121 controls the driving unit 34 to move the XY stage 33 in the X direction by a distance equal to the length of the small exposure area in the X direction. In Step S45, the CPU 121 controls the solenoids 112A and 112B via the driving unit 34 to lift the push-up mechanism 112 of the position constraining mechanism 32 in the Z direction so as to constrain the position of the glass window 36 from below.

Then, the process returns to Step S41, and Steps S41 to S45 are repeated until Step S41 is repeated for a predetermined number of times.

In Step S43, when it is determined that Step S41 is repeated for a predetermined number of times, i.e., when scanning of the small exposure area in the X direction is completed, in Step S46, the CPU 121 controls the driving unit 34 to move the XY stage 33 to the start position in the X direction.

In Step S47, the CPU 121 controls the driving unit 34 to move the XY stage 33 in the Y direction for a distance equal to the length of the small exposure area in the Y direction. Through the processing of Steps S46 and S47, the small exposure area is moved to the start position of the subsequent scanning line.

In Step S48, similar to Step S45, the CPU 121 controls the solenoids 112A and 112B via the driving unit 34 to lift the push-up mechanism 112 of the position constraining mechanism 32 in the Z direction so as to constrain the position of the glass window 36 from below.

In Step S49, the CPU 121 controls each unit to expose the fluid surface of the UV-curable resin 37 in the container 35 in units of small exposure areas. In Step S50, similar to Step S42, the CPU 121 controls the solenoids 112A and 112B via the driving unit 34 to lower the push-up mechanism 112 of the position constraining mechanism 32 in the Z direction so that the push-up mechanism 112 does not apply a force from the outside to the glass window 36.

In Step S51, the CPU 121 determines whether or not the process of Step S49 has been repeated for a predetermined number of times (for example, the number of small exposure areas arranged in the Y direction in the work area). In Step S51, when it is determined that the processing of Step S49 has not been repeated for a predetermined number of times, in Step S52, the CPU 121 controls the driving unit 34 to move the XY stage 33 in the X direction by a distance equal to the length of the small exposure area in the X direction.

In Step S53, similar to the processes in Steps S45 and 48, the CPU 121 controls the solenoids 112A and 112B via the driving unit 34 to lift the push-up mechanism 112 of the position constraining mechanism 32 in the Z direction so as to constrain the position of the glass window 36 from below. Then, the process returns to Step S41, and Steps S41 to S53 are repeated until Step S49 is repeated for a predetermined number of times.

At this time, in Step S43, it is determined whether or not the processing of Step S41 is repeated for a predetermined number of times (for example, the number of small exposure areas arranged in the X direction in the work area minus one).

Figure 12:
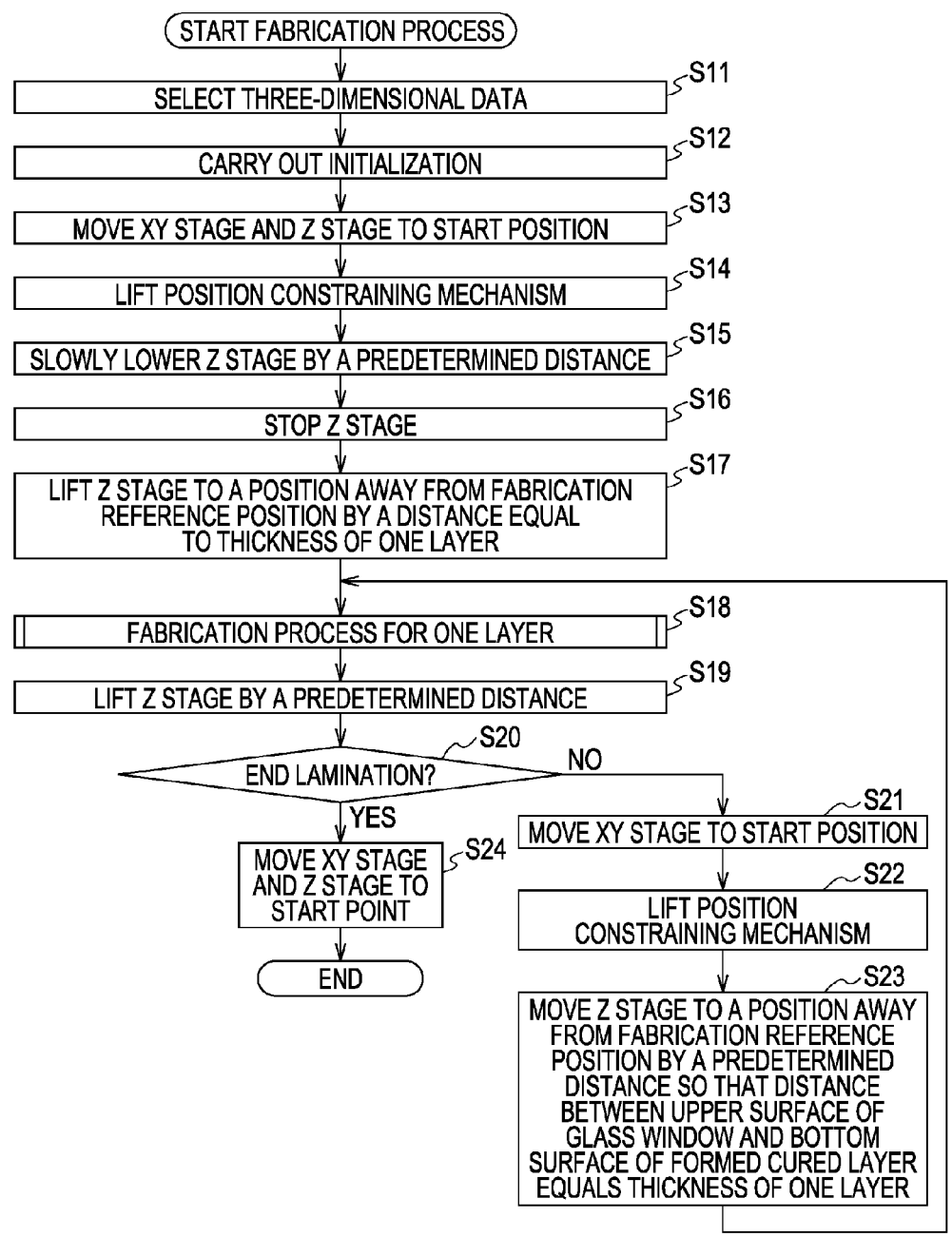
FIG. 12 is a flow chart illustrating the fabrication process by a CPU illustrated in FIG. 11.

In Step S51, when it is determined that the processing of Step S49 has been repeated for a predetermined number of time, i.e., when an area having a shape corresponding to sectional data of one layer is exposed, the process returns to Step S18 in FIG. 12.

Figure 14:
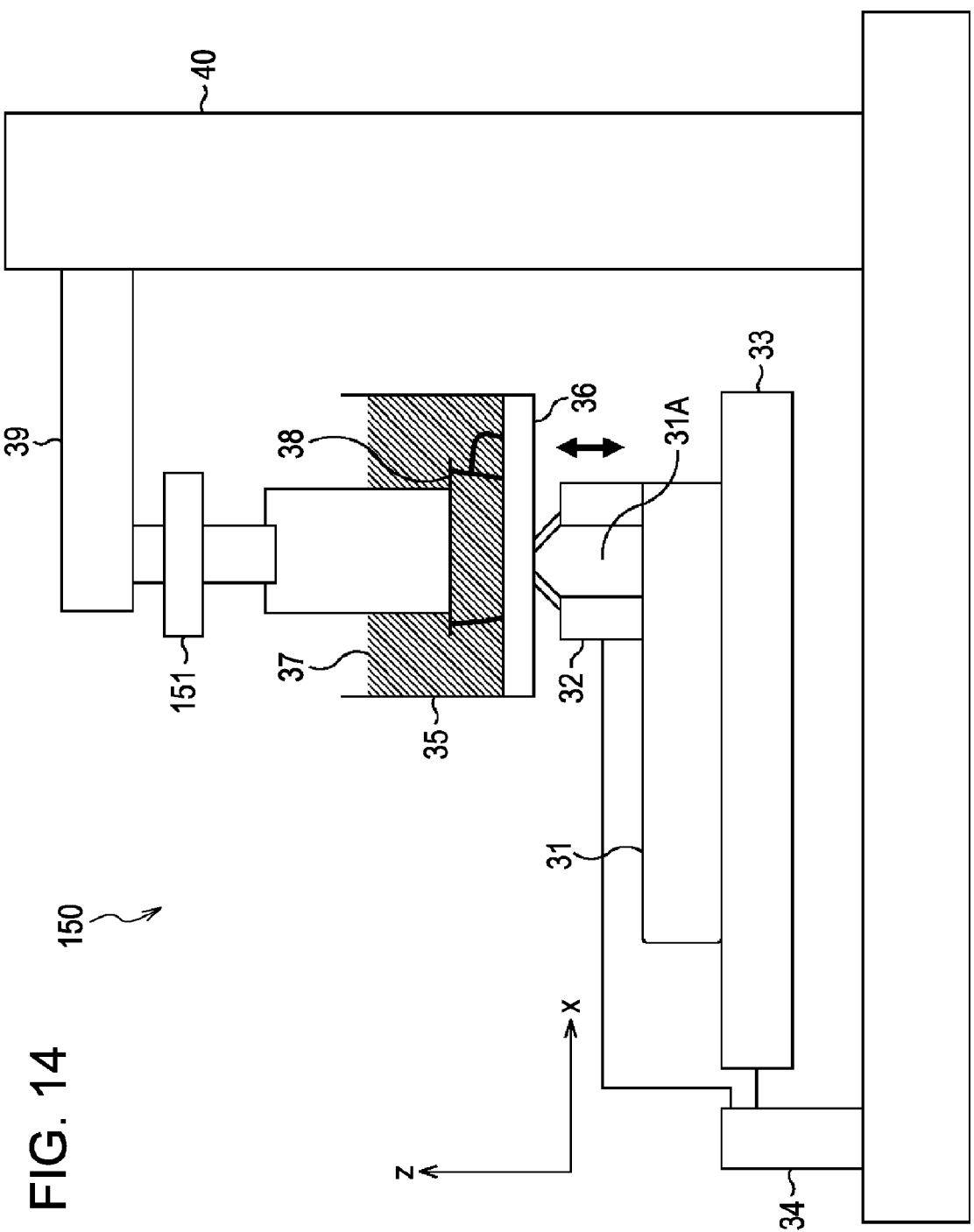
FIG. 14 illustrates a stereolithography apparatus according to a second embodiment of the present invention.

FIG. 14 illustrates a stereolithography apparatus according to a second embodiment of the present invention.

A stereolithography apparatus 150, which is shown in FIG. 14, includes an optical system 31 that has an objective lens 31A, a position constraining mechanism 32, an XY stage 33, a driving unit 34, a container 35, a glass window 36, UV-curable resin 37, a Z stage 38, an arm 39, a driving unit 40, and a pressure detector 151. The stereolithography apparatus 150 determines the fabrication reference position depending on a change in pressure applied to the Z stage 38.

In FIG. 14, components that are the same as those shown in FIG. 4 will be represented by the same reference numerals, and descriptions thereof are not repeated.

The pressure detector 151 shown in FIG. 14 is constructed of, for example, a load cell and is mounted on the Z stage 38. The pressure detector 151 detects pressure applied to the Z stage 38 and inputs the detected result to a control device 170 (FIG. 15), described below. The driving unit 40 controls the movement of the Z stage 38 on the basis of a control signal supplied from the control device 170 in accordance with the pressure detected by the pressure detector 151.

Figure 15:
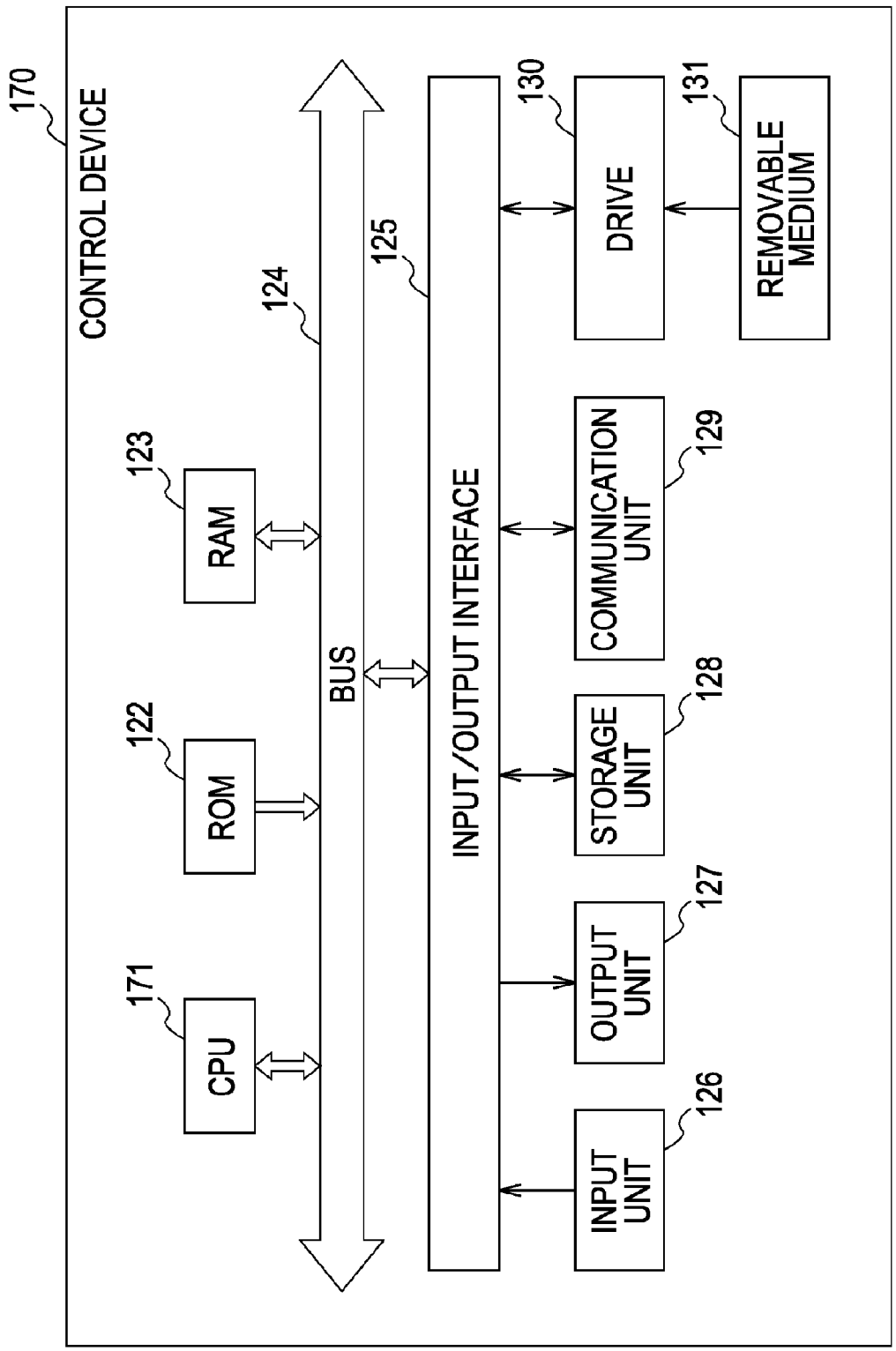
FIG. 15 is a block diagram of an example hardware configuration of a control device that controls the stereolithography apparatus illustrated in FIG. 14.

FIG. 15 illustrates an example hardware configuration of the control device 170 configured to control the stereolithography apparatus 150, which is shown in FIG. 14.

As shown in FIG. 15, the control device 170 includes a CPU 171, instead of the CPU 121 of the control device 120, which is shown in FIG. 11. The CPU 171 loads and executes a program stored in a storage unit 128 to the RAM 124 via an input/output interface 125 and a bus 124 and controls each device in the stereolithography apparatus 150 via a communication unit 129 to instruct the stereolithography apparatus 150 to carry out stereolithography.

For example, similar to the CPU 121 shown in FIG. 11, the CPU 171 inputs a control signal corresponding to an input from an input unit 126 via the communication unit 129 to a light source 81 or 91 or a shutter 82 or 96.

Similar to the CPU 121, the CPU 171 inputs a driving signal corresponding to sectional data to a spatial light modulator 86 and galvano mirrors 97 and 98 via the communication unit 129. Similar to the CPU 121, the CPU 171 inputs a control signal to a driving unit 74 and a driving unit 88 via the communication unit 129 on the basis of a returned beam from a reflection-light monitor unit 101 via the communication unit 129.

Similar to the CPU 121, the CPU 171 controls the solenoids 112A and 112B via the driving unit 34 so as to lift or lower a push-up mechanism 112 in the Z direction.

Similar to the CPU 121, the CPU 171 inputs a control signal to the driving unit 34 via the communication unit 129 so as to expose, in units of small exposure areas, an area having a shape corresponding to sectional data of one layer of the UV-curable resin 37. In this way, one cured layer is formed between the Z stage 38 and the glass window 36.

The CPU 171 detects the contact between the glass window 36 and the Z stage 38 on the basis of a change in the pressure input from the pressure detector 151 and sets that position of the Z stage 38 as a fabrication reference position. The CPU 171 inputs a control signal for moving the Z stage 38 in the Z direction from the fabrication reference position to a position a predetermined distance away from the fabrication reference position so that the distance between the glass window 36 and the cured layer becomes equal to the thickness of one cured layer to the driving unit 40 via the communication unit 129.

The CPU 171 inputs a control signal for lifting the Z stage 38 in the Z direction to the driving unit 40 via the communication unit 129 each time exposure corresponding to sectional data of one layer is completed. Then, the CPU 171 detects the separation of the cured layer from the glass window 36 on the basis of a change in the pressure input from the pressure detector 151, shown in FIG. 14, and inputs a control signal for stopping the lifting in the Z direction to the driving unit 40.

Figure 16:
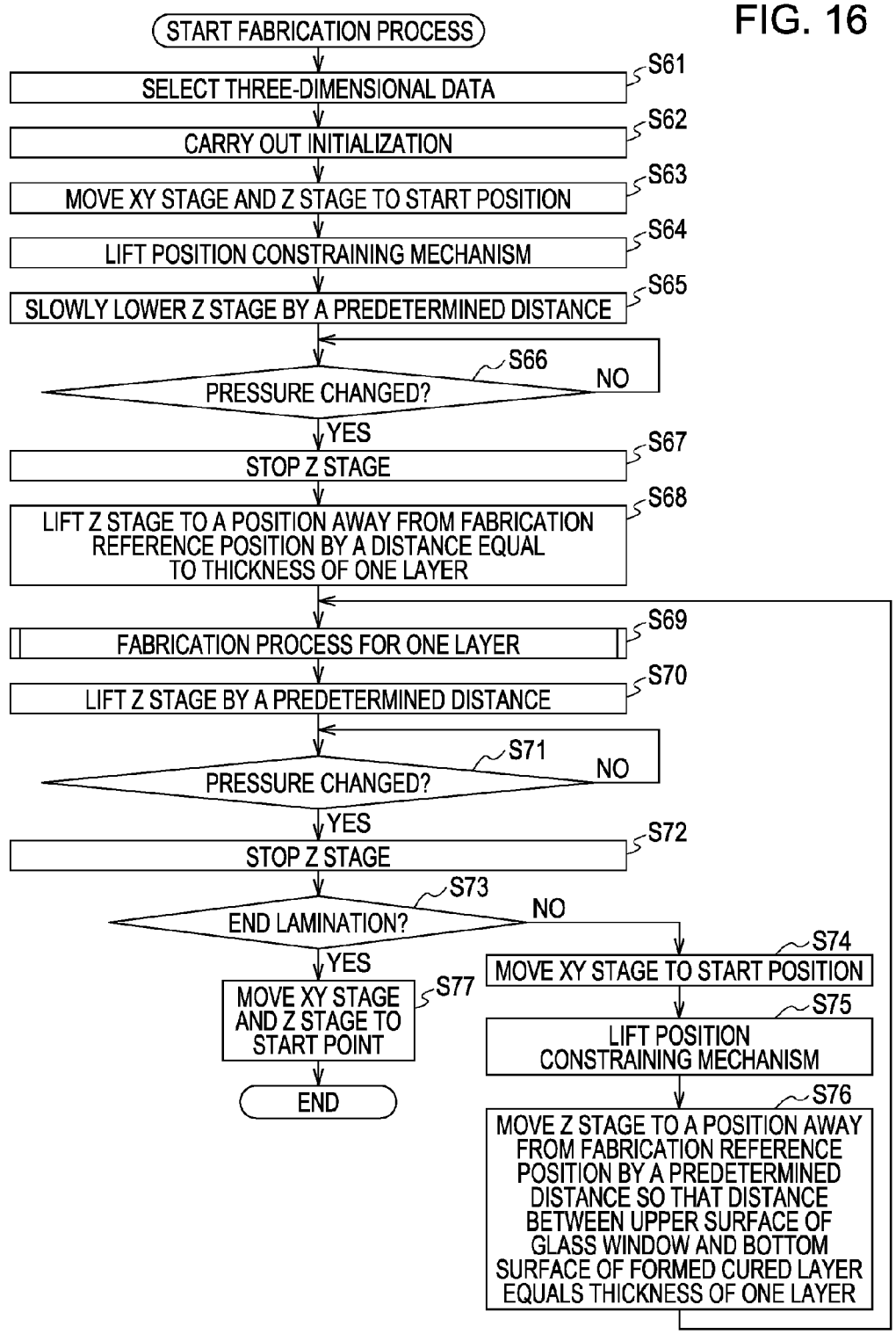
FIG. 16 is a flow chart illustrating a fabrication process by a CPU illustrated in FIG. 15.

Next, a stereolithography process carried out by the CPU 171, shown in FIG. 15, will be described with reference to FIG. 16. This stereolithography process is started when stereolithography is instructed by, for example, a user operating the input unit 126.

Since the processing in Steps S61 to S64 are the same as the processing in Steps S11 to S14 in FIG. 12, descriptions thereof will not be repeated.

In Step S65, the CPU 171 controls the driving unit 40 and lowers the Z stage 38 in the Z direction very slowly. In Step S66, the CPU 171 determines whether or not the pressure input from the pressure detector 151 has changed.

In other words, the pressure applied to the Z stage 38 is equal to the weight of the Z stage 38 until the Z stage 38 contacts the glass window 36. Once the Z stage 38 contacts the glass window 36, the pressure applied to the Z stage 38 becomes substantially zero. Therefore, the CPU 171 detects whether or not the Z stage 38 has contacted the glass window 36 by determining whether the pressure input from the pressure detector 151 has changed.

In Step S66, when it is determined that the pressure has not changed, i.e., when the Z stage 38 has not yet contacted the glass window 36, the CPU 171 operates in standby until the pressure changes.

In Step S66, when it is determined that the pressure input from the pressure detector 151 has changed, i.e., when the Z stage 38 contacts the glass window 36, in Step S67, the CPU 171 controls the driving unit 40 and stops the Z stage 38. The driving unit 40 sets the current position of the Z stage 38 as a reference for a fabrication position and controls the subsequent movement of the Z stage 38.

As described above, in the stereolithography apparatus 150, the CPU 171 detects the Z stage 38 contacting the glass window 36 on the basis of a change in pressure applied to the Z stage 38 and stops the lowering of the Z stage 38. Therefore, the Z stage 38 can be prevented from being lowered too much and breaking the glass window 36.

Since the Z stage 38 can be stopped at the position where the Z stage 38 contacts the glass window 36, the position of the Z stage 38 in the Z direction when the bottom surface of the Z stage 38 contacts the upper surface of the glass window 36 can be set as the fabrication reference position. Therefore, in Steps S68 and S76, described below, the driving unit 40 can precisely set the distance between the upper surface of the glass window 36 and the Z stage 38 or the bottom surface of the cured surface equal to the thickness of one cured layer to be subsequently formed, by controlling the movement of the Z stage 38 on the basis of the distance from the fabrication reference distance. As a result, the lamination precision can be improved.

Figure 13:
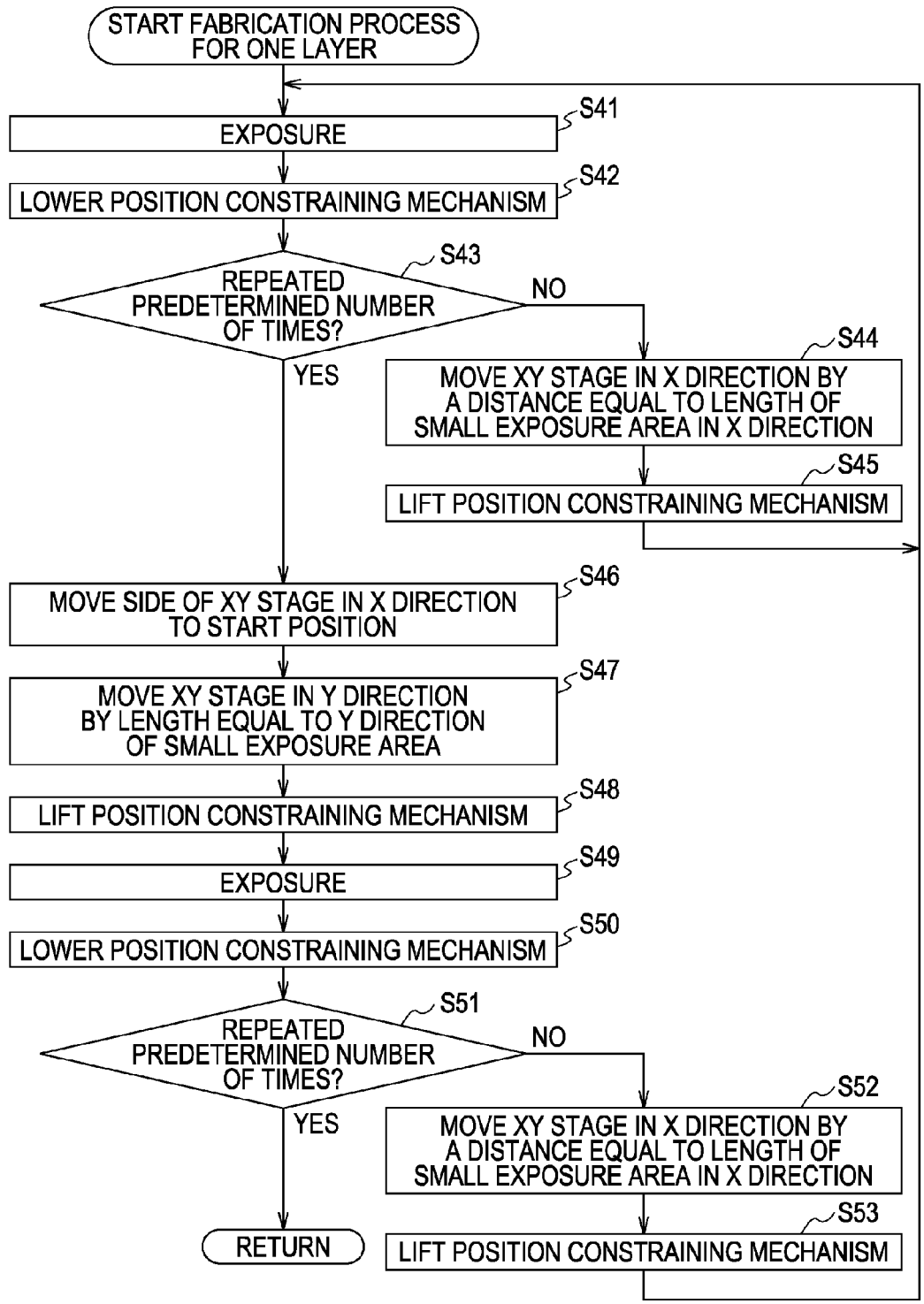
FIG. 13 is a flow chart illustrating the layer fabrication process of Step S18 in FIG. 12.

In Steps S68 and S69, similar to Steps S17 and S18, the Z stage 38 is lifted to a position away from the fabrication reference position by a distance equal to the thickness of one cured layer, and then the layer fabricating process in FIG. 13 is carried out.

In Step S70, the CPU 171 controls the driving unit 40 so as to lift the Z stage 38 in the Z direction. In Step S71, the CPU 171 determines whether or not the pressure input from the pressure detector 151 has changed. More specifically, the Z stage 38 is pulled downward by the cured layer bonded to the glass window 36 until the cured layer is separated from the glass window 36. Thus, the pressure applied to the Z stage 38 is a force greater than a force caused by the weight of the Z stage 38 and the weight of the cured layer. However, when the cured layer is separated from the glass window 36, the pressured applied to the Z stage 38 becomes equal to a force caused by the weight of the Z stage 38 and the weight of the cured layer. Therefore, the CPU 171 detects the separation of the cured layer on the basis of whether or not the pressure input from the pressure detector 151 has changed.

In Step S71, when it is determined that the pressure has not changed, i.e., when it is determined that the cured layer has not yet been separated, the CPU 171 operates in standby until the pressure changes.

In Step S71, when it is determined that the pressure has changed, i.e., when it is determined that the cured layer has been separated, in Step S72, the CPU 171 controls the driving unit 40 so as to stop the Z stage 38. Since the processing of Steps S73 to S77 is the same as the processing of Steps S20 to S24 in FIG. 12, descriptions thereof will not be repeated.

Figure 17:
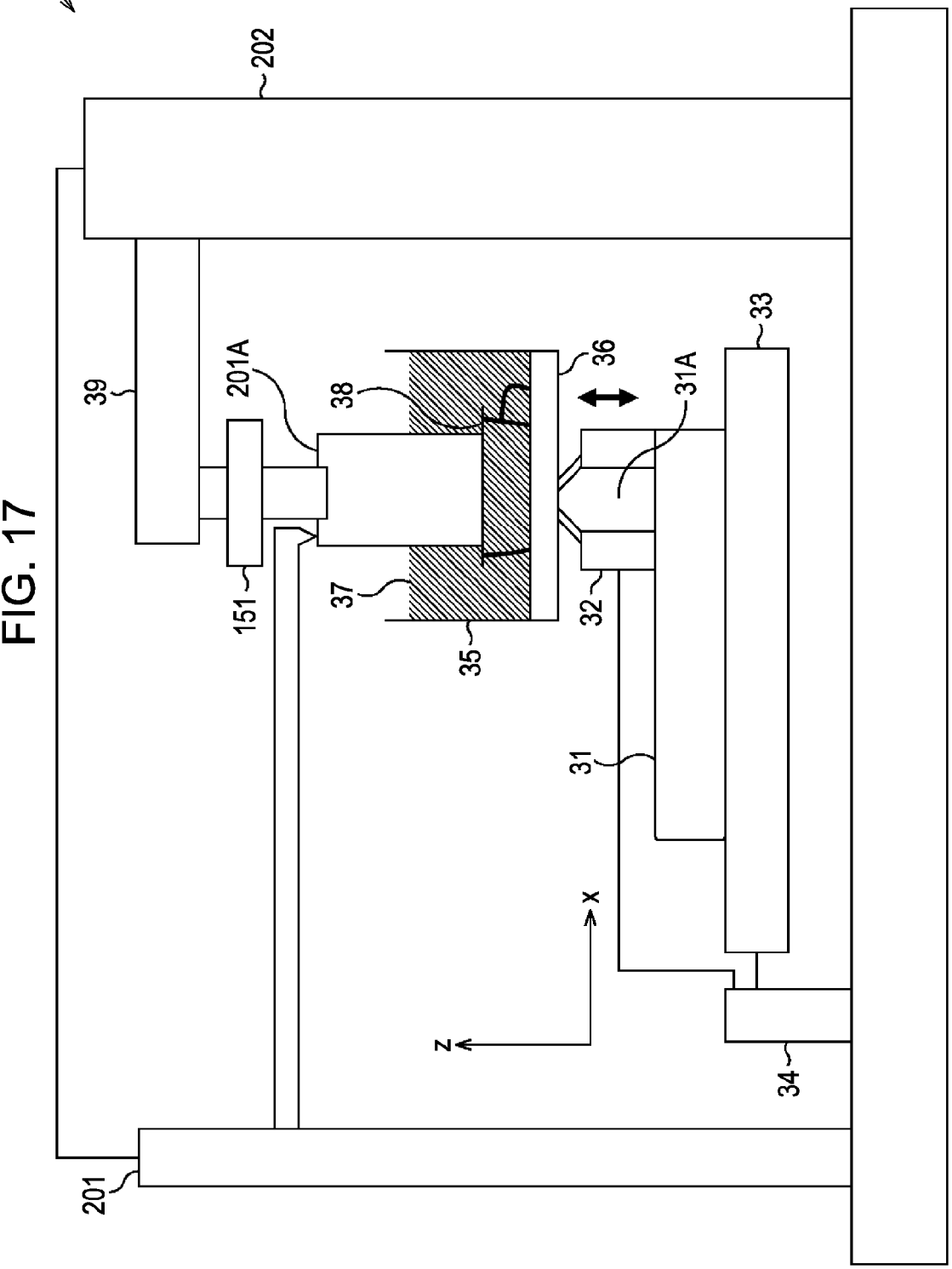
FIG. 17 illustrates a stereolithography apparatus according to third embodiment of the present invention.

FIG. 17 illustrates a stereolithography apparatus according to a third embodiment of the present invention.

A stereolithography apparatus 200, which is shown in FIG. 17, includes an optical system 31 that has an objective lens 31A, a position constraining mechanism 32, an XY stage 33, a driving unit 34, a container 35, a glass window 36, UV-curable resin 37 such as liquid resin, a Z stage 38, an arm 39, and a pressure detector 151, a position measuring mechanism 201, and a driving unit 202. The stereolithography apparatus 200 measures the position of the Z stage 38 from the fabrication reference position in the Z direction and moves the Z stage 38 on the basis of this position.

In FIG. 17, components that are the same as those shown in FIGS. 4 and 14 will be represented by the same reference numerals, and descriptions thereof are not repeated.

The position measuring mechanism 201 shown in FIG. 17 includes a laser distance meter and an electric micrometer. Setting the position of a surface 201A, which is close to the bottom surface of the Z stage 38 and orthogonal to the Z direction, when the Z stage 38 is at the fabrication reference position as a reference point, the position measuring mechanism 201 measures the distance from this reference point to the current position of the surface 201A, i.e., the distance in the Z direction from the upper surface of the glass window 36 to the bottom surface of the Z stage 38, as the position of the Z stage 38 in the Z direction from the fabrication reference position and inputs this distance to the driving unit 202.

The driving unit 202 moves the Z stage 38 to a predetermined position according to the control of the control device 170 (FIG. 15) and the position input from the position measuring mechanism 201. More specifically, the driving unit 202 moves the Z stage 38 such that the position measured by the position measuring mechanism 201 matches the movement position instructed by the control signal from the control device 170. In this way, in the stereolithography apparatus 200, the positioning precision of the bottom surface of the Z stage 38 where a cured layer is formed can be improved.

In other words, the positioning precision of the Z stage 38 is determined by the driving unit 202 and the rigidity of the arm 39 (for example, bending of the arm 39). However, since, in the stereolithography apparatus 200, the position in the Z direction of the surface 201A that is close to the bottom surface of the Z stage 38 where a cured layer is formed is measured and the movement of the Z stage 38 is controlled on the basis of the this position, the positioning precision of the bottom surface of the Z stage 38 can be improved. As a result, the lamination precision can be further improved.

As described above, with the stereolithography apparatus 30 (150, 200), stereolithography is performed using a liquid UV-curable resin 37. However, the condition of the UV-curable resin is not limited, and instead, for example, a film-like UV-curable resin may be used.

The embodiments of the present invention may be applied to not only a stereolithography apparatus performing stereolithography according to the tiling method but also to a stereolithography apparatus performing stereolithography according to the full-exposure method or the beam scanning method.

According to the embodiments of the present invention, the steps of a program stored in a program recording medium may be processed sequentially according to the order they are described or may not be processed sequentially but instead simultaneously or independently.

The embodiments of the present invention are not limited to those described above, and various modifications may be made within the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A stereolithography apparatus configured to fabricate a three-dimensional model by forming a cured layer by irradiating an interface of a photocurable resin with light corresponding to sectional data of the three-dimensional model and staking the cured layer, the stereolithography apparatus comprising:
   a container holding the photocurable resin and having a constraining window at the bottom of the container to constrain the interface of the photocurable resin, the constraining window having oppositely facing first and second surfaces, the first surface facing the photocurable resin;
   a vertical movement table movable in a vertical direction orthogonal to the interface of the photocurable resin;
   an optical system configured to form the cured layer between the vertical movement table and the constraining window by irradiating the interface of the photocurable resin with light through the constraining window; and
   a position constraining mechanism moveable in the vertical direction and configured to substantially flatten the constraining window by applying a force in the vertical direction to the second surface of the constraining window from the outside of the container when the cured layer is formed by the optical system.

2. A stereolithography apparatus configured to fabricate a three-dimensional model by forming a cured layer by irradiating an interface of a photocurable resin with light corresponding to sectional data of the three-dimensional model and staking the cured layer, the stereolithography apparatus comprising:
   a container holding the photocurable resin and having a constraining window configured to constrain the interface of the photocurable resin, the constraining window having oppositely facing first and second surfaces, the first surface facing the photocurable resin;
   a vertical movement table movable in a vertical direction orthogonal to the interface of the photocurable resin;
   an optical system configured to form the cured layer between the vertical movement table and the constraining window by irradiating the interface of the photocurable resin with light through the constraining window;
   a position constraining mechanism moveable in the vertical direction and configured to substantially flatten the constraining window by applying a force in the vertical direction to the second surface of the constraining window from the outside of the container when the cured layer is formed by the optical system; and a parallel movement table configured to move a rectangular area in a parallel direction parallel to the interface of the photocurable resin when the optical system emits light to the interface of the photocurable resin in predetermined units of the rectangular area, wherein the parallel movement table scans the rectangular area in the parallel direction by moving the rectangular area in the parallel direction, and wherein the position constraining mechanism substantially flattens an area on the constraining window corresponding to the rectangular area when the rectangular area is irradiated with light emitted from the optical system, and the position constraining mechanism does not apply force from the outside of the container to the constraining window when the parallel movement table is moved.

3. A stereolithography apparatus configured to fabricate a three-dimensional model by forming a cured layer by irradiating an interface of a photocurable resin with light corresponding to sectional data of the three-dimensional model and staking the cured layer, the stereolithography apparatus comprising:

a container holding the photocurable resin and having a constraining window configured to constrain the interface of the photocurable resin, the constraining window having oppositely facing first and second surfaces, the first surface facing the photocurable resin;

a vertical movement table movable in a vertical direction orthogonal to the interface of the photocurable resin;

an optical system configured to form the cured layer between the vertical movement table and the constraining window by irradiating the interface of the photocurable resin with light through the constraining window;

a position constraining mechanism moveable in the vertical direction and configured to substantially flatten the constraining window by applying a force in the vertical direction to the second surface of the constraining window from the outside of the container when the cured layer is formed by the optical system; and pressure detecting means for detecting pressure applied to the vertical movement table; and contact detecting means for detecting contact between the vertical movement table and the constraining window on the basis of a change in pressure detected by the pressure detecting means, wherein, when staking the cured layer, the vertical movement table moves in the vertical direction with reference to a position of the vertical movement table in the vertical direction when contact is detected by the contact detecting means.

4. The stereolithography apparatus according to claim 3, wherein the contact detecting means detects separation of the cured layer from the constraining window based on a change in pressure detected by the pressure detecting means, and wherein, when the cured layer is formed, the cured layer is separated from the constraining window by moving the vertical movement table in the vertical direction until separation is detected by the contact detecting means.

5. The stereolithography apparatus according to claim 1, further comprising:

measuring means for measuring a distance from the constraining window to the vertical movement table in the vertical direction, wherein, when stacking the cured layer, the vertical movement table moves in the vertical direction on the basis of a measurement result of the measuring means.

6. A stereolithography apparatus configured to fabricate a three-dimensional model by forming a cured layer by irradiating an interface of a photocurable resin with light corresponding to sectional data of the three-dimensional model and stacking the cured layer, the stereolithography apparatus comprising:

a container holding the photocurable resin and having a constraining window configured to constrain the interface of the photocurable resin;

a vertical movement table movable in a vertical direction orthogonal to the interface of the photocurable resin;

an optical system configured to form the cured layer between the vertical movement table and the constraining window by irradiating the interface of the photocurable resin with light through the constraining window;

pressure detecting means for detecting pressure applied to the vertical movement table; and contact detecting means for detecting contact between the vertical movement table and the constraining window on the basis of a change in pressure detected by the pressure detecting means, wherein, when stacking the cured layer, the vertical movement table moves in the vertical direction with reference to a position of the vertical movement table in the vertical direction when contact is detected by the contact detecting means.

7. A stereolithography apparatus configured to fabricate a three-dimensional model by forming a cured layer by irradiating an interface of a photocurable resin with light corresponding to sectional data of the three-dimensional model and stacking the cured layer, the stereolithography apparatus comprising:

a container holding the photocurable resin and having a constraining window configured to constrain the interface of the photocurable resin;

a vertical movement table movable in a vertical direction orthogonal to the interface of the photocurable resin;

an optical system configured to form the cured layer between the vertical movement table and the constraining window by irradiating the interface of the photocurable resin with light through the constraining window;

a pressure detecting unit configured to detect pressure applied to the vertical movement table; and a contact detecting unit configured to detect contact between the vertical movement table and the constraining window on the basis of a change in pressure detected by the pressure detecting means, wherein, when stacking the cured layer, the vertical movement table moves in the vertical direction with reference to a position of the vertical movement table in the vertical direction when contact is detected by the contact detecting means.

8. The stereolithography apparatus of claim 6, wherein:

the constraining window has oppositely facing first and second surfaces, the first surface facing the photocurable resin, and a position constraining mechanism is moveable in the vertical direction and configured to substantially flatten the constraining window by applying a force in the vertical direction to a second surface of the constraining window from the outside of the container when the cured layer is formed by the optical system.

9. The stereolithography apparatus of claim 7, wherein:
the constraining window has oppositely facing first and second surfaces, the first surface facing the photocurable resin, and
a position constraining mechanism is moveable in the vertical direction and configured to substantially flatten the constraining window by applying a force in the vertical direction to a second surface of the constraining window from the outside of the container when the cured layer is formed by the optical system.

* * * * *